United States Patent [19]

Löcher

[11] 4,420,367
[45] Dec. 13, 1983

[54] METHOD FOR ETCHING A RECRYSTALLIZED ALUMINUM FOIL FOR ELECTROLYTIC CAPACITORS

[75] Inventor: Günter Löcher, Nattheim, Fed. Rep. of Germany

[73] Assignee: Siemens Aktiengesellschaft, Berlin and Munich, Fed. Rep. of Germany

[21] Appl. No.: 368,515

[22] Filed: Apr. 15, 1982

[30] Foreign Application Priority Data

May 7, 1981 [DE] Fed. Rep. of Germany ....... 3118151

[51] Int. Cl.³ .................. B44C 1/22; C03C 15/00; C03C 25/06; C23F 1/00
[52] U.S. Cl. .................. 156/651; 156/665; 204/33; 204/129.35; 252/79.2
[58] Field of Search .............. 156/651, 665; 252/79.2; 204/129.1, 129.35, 33

[56] References Cited

U.S. PATENT DOCUMENTS

| 2,193,711 | 3/1940 | Burnham | 156/665 X |
| 2,699,382 | 1/1955 | Altenpohl | 156/651 |
| 2,755,237 | 7/1956 | Turner | 156/665 X |
| 3,666,642 | 5/1972 | Alwan et al. | 156/651 X |
| 3,779,877 | 12/1973 | Alwitt | 204/129.75 |
| 4,213,835 | 7/1980 | Fickelscher | 204/129.25 |

FOREIGN PATENT DOCUMENTS 2801218 of 0000 Fed. Rep. of Germany .

Primary Examiner—William A. Powell
Attorney, Agent, or Firm—Herbert L. Lerner; Laurence A. Greenberg

[57] ABSTRACT

Method for etching a recrystallized aluminum foil for electrolytic capacitors by carrying out an electrolytic tunnel formation in a first etching stage, characterized by the feature that the further etching for tunnel enlargement takes place chemically in one or several etching stages.

10 Claims, 3 Drawing Figures

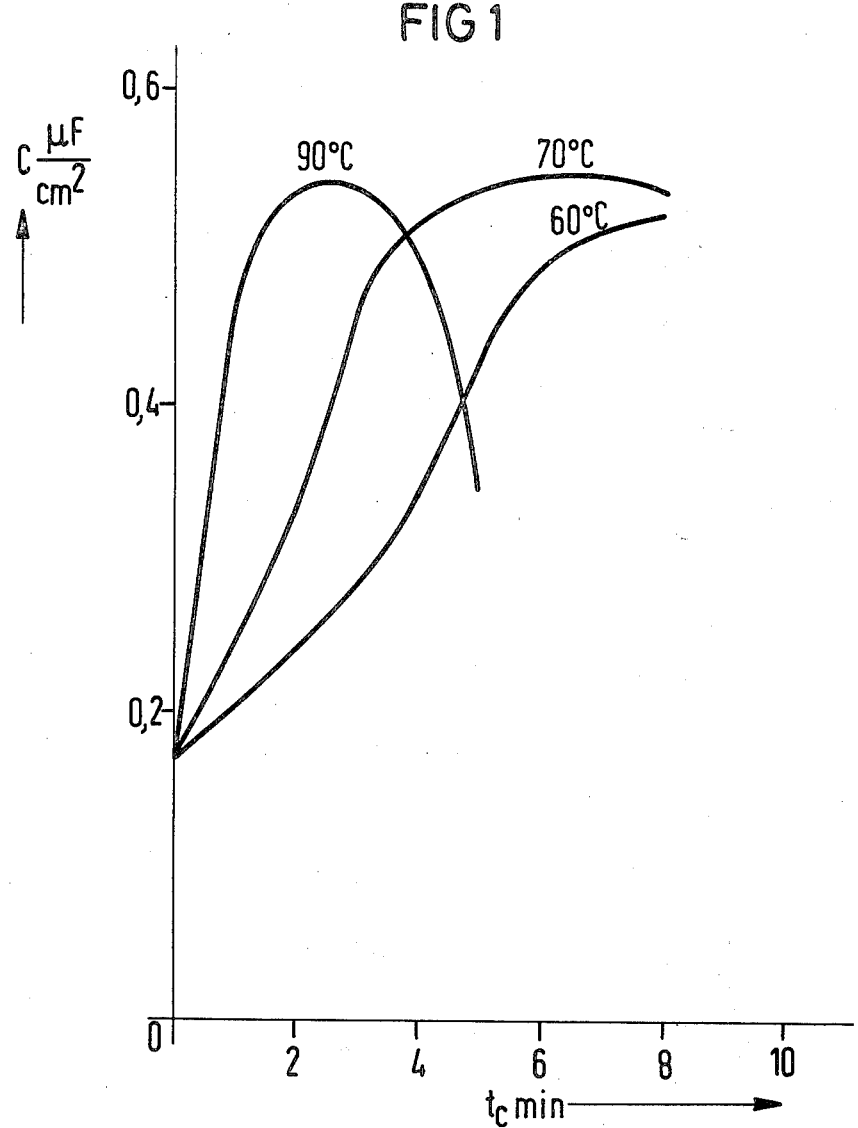

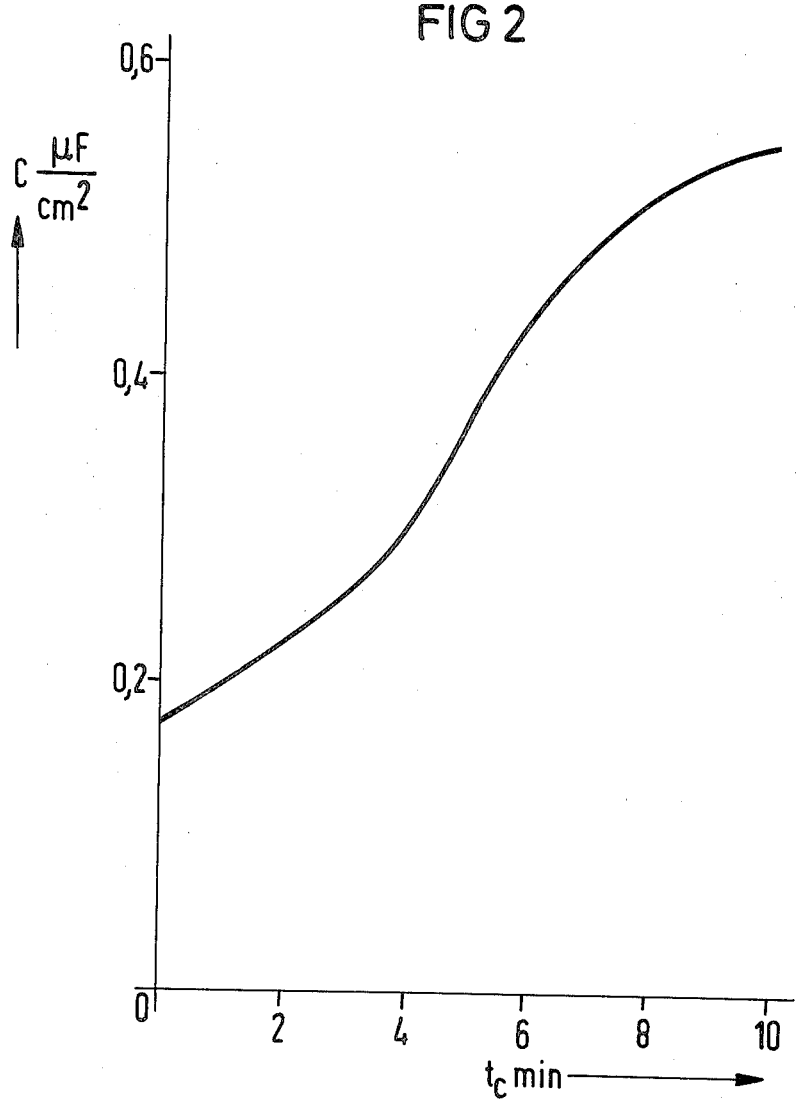

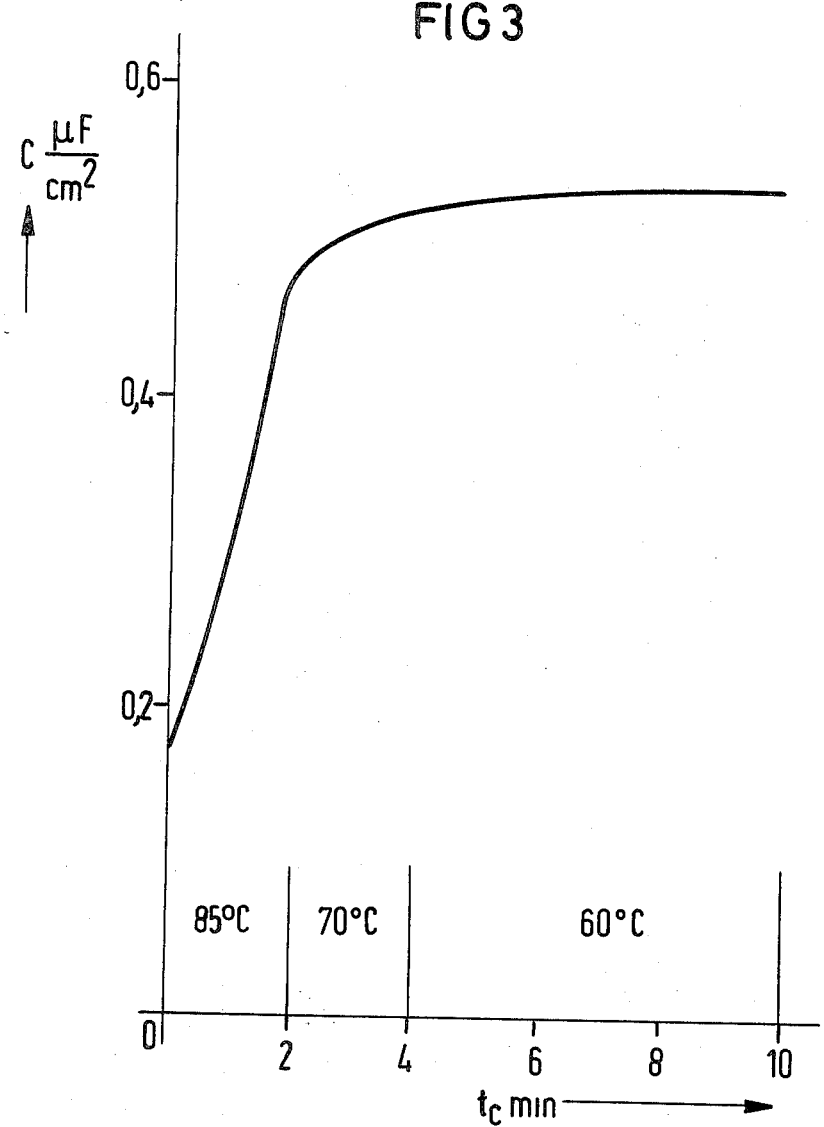

METHOD FOR ETCHING A RECRYSTALLIZED ALUMINUM FOIL FOR ELECTROLYTIC CAPACITORS

BACKGROUND OF THE INVENTION

1. Field of the Invention

The invention relates to a method for etching a recrystallized aluminum foil for electrolytic capacitors by carrying out an electrolytic tunnel etching process in a first etching stage.

2. Description of the Prior Art

Such method of etching is known from German Pat. No. 28 01 218. In the first etching stage, a tunnel structure is made in a chloride-containing solution where the etched tunnels grow auto-catalytically in a crystal-oriented [100] direction into the recrystallized aluminum lattice at a growth rate of several μm/s with a pore diameter of about 0.2 μm. The enlargement of the etched tunnel in the further etching is accomplished by the known method which is likewise electrolytically, in a chloride-ion-containing solution. An etching current density corresponding to the potential range below the pitting potential of aluminum is used. The maximally usable and relatively low etching current density is determined by the passive current density of aluminum in the respective solution. If the etching current density referred to the actual roughened foil surface is greater than the maximum passive current density, coarse pitting is produced. In expanding the tunnels electrolytically, the danger therefore exists that the tunnel structure is destroyed entirely or partially by coarse pitting, if the current density distribution is irregular due to the arrangement of contact rolls, and in the case of foils with irregular or altogether low tunnel density (corresponding to a small surface). Furthermore, in electrolytic etching, a high amount of etching charge is needed, which means high power consumption and, a considerable amount of equipment for the large currents that must be made available.

SUMMARY OF THE INVENTION

An object of the invention is to provide a method for etching a recrystallized aluminum foil of the type mentioned at the outset, which method overcomes the difficulties pointed out above.

According to the invention, this problem is solved in a method of the type mentioned at the outset by the provision that the continued etching for enlarging the tunnels is non-electrolytic but is accomplished chemically in one or several etching stages.

With the foregoing and other objects in view, there is provided in accordance with the invention a method for etching a recrystallized aluminum foil for electrolytic capacitors which comprises subjecting the recrystallized aluminum foil in a first etching stage to electrolytic tunnel formation to form a tunnel structure in the aluminum, and subsequently subjecting the aluminum foil with the tunnel structure from the first etching stage in at least one further non-electrolytic etching stage to effect tunnel enlargement by chemical etching.

Other features which are considered as characteristic for the invention are set forth in the appended claims.

Although the invention is illustrated and described herein as embodied in a method for etching a recrystallized aluminum foil for electrolytic capacitors, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 shows, in the form of three curves, the course of the specific capacity as a function of the etching time for three different aluminum foil test pieces which after the electrolytic tunnel formation, were further non-electrolytically etched in $HNO_3$ solutions at bath temperatures of 60° C., 70° C. and 90° C.

FIG. 2 shows the curve of the specific capacity as a function of the etching time for another aluminum foil test piece subjected to tunnel enlargement in a bath containing $Al(NO_3)_3$.

FIG. 3 similarly shows the results of tunnel enlargement of another foil sheet piece which was subjected to three $HNO_3$ baths at decreasing temperatures.

DETAILED DESCRIPTION OF THE INVENTION

In the etching method according to the invention, contrary to the known method of electrolytic two-stage etching, even if the roughning of the foil in the tunnel formation stage is low no coarse pitting is produced in the tunnel enlargement stages. In the purely chemical further etching according to the invention, the tunnel enlargement is independent of the preceding roughening of the foil in the tunnel formation stage, contrary to the electrolytic tunnel enlargement which takes place with constant etching rate, so that a constant tunnel diameter is produced.

The method according to the invention is further distinguished by the fact that considerable power savings go along with its application. Only about 20% of the entire equivalent etching charge are electrolytically reacted as compared with the known electrolytic two-stage etching. Along with this goes a smaller amount of equipment, since savings are also achieved in the installation and operation of etching rectifiers and the provision of cathode material (usually silver) for the tunnel enlargement stages.

In further embodiments of the invention, the tunnel formation is carried out with constant anode potential or with a current density which approaches the course of the current density in time with potentiostatic etching.

In one preferred embodiment of the method according to the invention, the further etching takes place in a solution which is free of halogen ions and contains nitrate ions. Through this use of a chloride free etching electrolyte for the purely chemical tunnel enlargement, aluminum foil passes through a chloride-containing electrolyte only at the beginning of the etching procedure in the electrolytic tunnel formation stage. During the chemical etching which follows according to the invention, chloride ions are additionally washed out, and the formation of chloride-containing difficult-to-dissolve cover layers is avoided by the uniform dissolution of aluminum. This leads to an improvement of the electrical data of electrolytic capacitors manufactured according to the method of the invention, since chloride ions remaining on the foil have detrimental effects, as is well known.

According to one preferred embodiment, solutions are used which contain $HNO_3$ and/or $Al(NO_3)_3$. The solutions contain preferably, 1% by weight to 30% by weight $HNO_3$ or 0.2 mol/liter to 2 mol/liter of $Al(NO_3)_3$ and are applied at etching temperatures of 40° to 95° C. The higher the etching temperature, the more rapid is the tunnel enlargement through aluminum dissolution. If $Al(NO_3)_3$ solutions are used, etching temperatures above 90° C. so as not to obtain excessively long etching times should preferably be set because of the lower dissolution rates.

To reduce the danger of so-called "overetching", it is therefore advantageous to carry out the further etching in several baths with stepwise reduced Al dissolution rates. The reduction of the Al dissolution rate can be accomplished by reducing the bath temperatures or the bath concentrations stepwise.

In addition to using solutions containing nitrate ions, as described, it is also possible to use etching electrolytes containing hydroxides (for instance NaOH); however, a subsequent treatment in acid may be necessary here in order to remove undesirable cover layers.

Further advantages of the method according to the invention will be explained in the following embodiment examples.

In the attached drawings, FIGS. 1–3 show the course of the specific capacity as function of the etching time $t_c$.

All embodiment examples refer to the etching treatment of a recrystallized aluminum foil which had been subjected prior to the etching treatment to a heat treatment in known manner, in order to repair undesirable discloations in the crystal structure caused by rolling. The foils (75 $\mu m$ thick) were, in a first etching stage, etched electrolytically in a chloride-ion-containing solution with a current density approaching the current density course in time for potentiostatic tunnel production, where the tunnel structure was developed with tunnel diameters of $\leq 0.1$ $\mu m$. After the treatment described in detail in the embodiment examples, the foils were formed at 400 V forming voltage and the specific capacity which is a measure for the roughening of the aluminum foil, was determined.

EMBODIMENT EXAMPLE 1

Three different foil test pieces were, after the electrolytic tunnel formation, etched further in $HNO_3$ solutions (11% by weight) at bath temperatures of 60° C., 70° C. and 90° C. Maximum specific capacities of about 0.54 $\mu F/cm^2$ were obtained there, which were reached in different periods of time, depending on the bath temperature.

It can be seen from FIG. 1 that with the purely chemical tunnel enlargement according to the invention, substantially shorter etching times are obtained than with conventional electrolytic tunnel enlargement. This can be explained by the fact that with the known method, the continued etching must be carried out with an etching current density corresponding to the potential range below the pitting potential of aluminum, in order to prevent coarse pitting. Due to the relatively low etching current densities, a substantially longer treatment time is necessary in order to obtain the tunnel diameters, necessary for HV-anodes, for approximately 1 $\mu m$ to 2 $\mu m$.

In contrast thereto, substantially shorter treatment times are possible with the method according to the invention, especially at higher bath temperatures. However, care must be taken that the optimum etching time is not exceeded since then the specific capacity decreases again because of "overetching". This can be seen particularly from the curve for a bath temperature of 90° C.

EMBODIMENT EXAMPLE 2

In a further test piece, the tunnel enlargement was carried out according to the invention in a bath which contained $Al(NO_3)_3$ in a concentration of 1 mol/liter. The bath temperature was 95° C. As can be seen from FIG. 2, a maximum specific capacity of about 0.55 $\mu F/cm^2$ is obtained. It can be seen from FIG. 2 that in aluminum nitrate-containing baths, there is no danger of "overetching" even at high bath temperatures because of the low dissolution rate.

EMBODIMENT EXAMPLE 3

In a further test piece, the continued etching took place in three etching stages in baths with $HNO_3$ solutions (11% by weight). The first bath had a temperature of 85° C., the second of 70° C. and the third of 60° C. As in embodiment example 1, a maximum specific capacity of 0.54 $\mu F/cm^2$ was reached. In FIG. 3, the increase of the specific capacity is shown as a function of the etching time and the bath temperature. It can be seen from FIG. 3 that the danger of "overetching" is likewise reduced if several subsequent chemical etching stages with bath temperatures which are decreased in steps are used.

In the embodiment examples, the etching parameters of the tunnel formation stage in the electrolytic first etching stage are chosen so that a tunnel density as high as possible is reached with a share of coarse pitting as low as possible. The electrolytic etching is terminated here, after the etching tunnels have been formed, since further etching with the high etching-current densities in the etching stage optimized for tunnel formation would result, in addition to an enlargement of the tunnel diameters, in irregular, coarse aluminum removal, whereby the tunnel structure would again be destroyed in part.

The foregoing is a description corresponding to German Application No. P 31 18 151.1, dated May 7, 1981, International priority of which is being claimed for the instant application, and which is hereby made part of this application. Any discrepancies between the foregoing specification and the aforementioned corresponding German application are to be resolved in favor of the latter.

I claim:

1. Method for etching a recrystallized aluminum foil for electrolytic capacitors which comprises subjecting the recrystallized aluminum foil in a first etching stage to electrolytic tunnel formation to form a tunnel structure in the aluminum, and subsequently subjecting the aluminum foil with the tunnel structure from the first etching stage in at least one further non-electrolytic etching stage in a solution free of halogen ions to effect tunnel enlargement by chemical etching.

2. Method according to claim 1, wherein the tunnel formation is carried out with constant anode potential.

3. Method according to claim 1, wherein the tunnel formtion is carried out with a current density which approaches the current density course in time for potentiostatic etching.

4. Method according to claim 1 or claim 2 or claim 3, wherein the further non-electrolytic etching takes place in said solution free of halogen ions maintained within the range of 40° C. to 95° C.

5. Method according to claim 1 or claim 2 or claim 3, wherein the further non-electrolytic etching takes place with solutions containing nitrate ions.

6. Method according to claim 1 or claim 2 or claim 3, wherein the further non-electrolytic etching takes place with solutions containing a nitrate selected from the group consisting of $HNO_3$ and $Al(NO_3)_3$.

7. Method according to claim 1 or claim 2 or claim 3, wherein the further non-electrolytic etching takes place with solutions containing a nitrate selected from the group consisting of $HNO_3$ and $Al(NO_3)_3$, and in which the concentration of the solutions are 1% by weight to 30% by weight $HNO_3$ and 0.2 mol/liter to 2 mol/liter $Al(NO_3)_3$.

8. Method according to claim 1, wherein the further non-electrolytic etching is carried out in several baths with Al dissolution rates which are reduced in steps.

9. Method according to claim 8, wherein the stepwise reduction of the Al dissolution rate is accomplished with bath temperatures reduced in steps.

10. Method according to claim 8, wherein the stepwise reduction of the Al dissolution rate is accomplished with both concentrations reduced in steps.

* * * * *